United States Patent

[11] 3,534,805

| | | | |
|---|---|---|---|
| [72] | Inventor | Krister Allan Ackerfeldt<br>Vallentuna, Sweden | |
| [21] | Appl. No. | 737,768 | |
| [22] | Filed | June 17, 1968 | |
| [45] | Patented | Oct. 20, 1970 | |
| [73] | Assignees | Bo Grels Alarik Berg<br>Tumba, ;<br>Jarl Leo Ronald Soderstrom<br>Lidingo, Sweden | |
| [32] | Priority | June 22, 1967 | |
| [33] | | Sweden | |
| [31] | | 8,926/67 | |

[54] METHOD OF CLEANING THE GAS-SWEPT HEATING SURFACES IN HEAT EXCHANGERS
2 Claims, 2 Drawing Figs.

[52] U.S. Cl. .................................................... 165/1,
165/95, 134/7

[51] Int. Cl. .................................................... F28g 1/12
[50] Field of Search .......................................... 165/5,
95, .1; 134/7

[56] References Cited
UNITED STATES PATENTS

| | | | |
|---|---|---|---|
| 2,698,265 | 12/1954 | Klinger. Jr. ................ | 134/7 |
| 2,765,588 | 10/1956 | Puhr-Westerheide ........ | 165/95 |
| 3,053,704 | 9/1962 | Munday ...................... | 134/7 |

*Primary Examiner*—Robert A. O'Leary
*Assistant Examiner*—Charles Sukalo
*Attorney*—Pierce, Scheffler and Parker ABSTRACT: A method of cleaning gas-swept heating surfaces in a heat exchanger by permitting impact bodies such as pellets of aluminium or an alloy thereof to fall onto the heating surfaces. The heating surfaces may be precoated with a layer of aluminium or an alloy thereof.

Patented Oct. 20, 1970
3,534,805
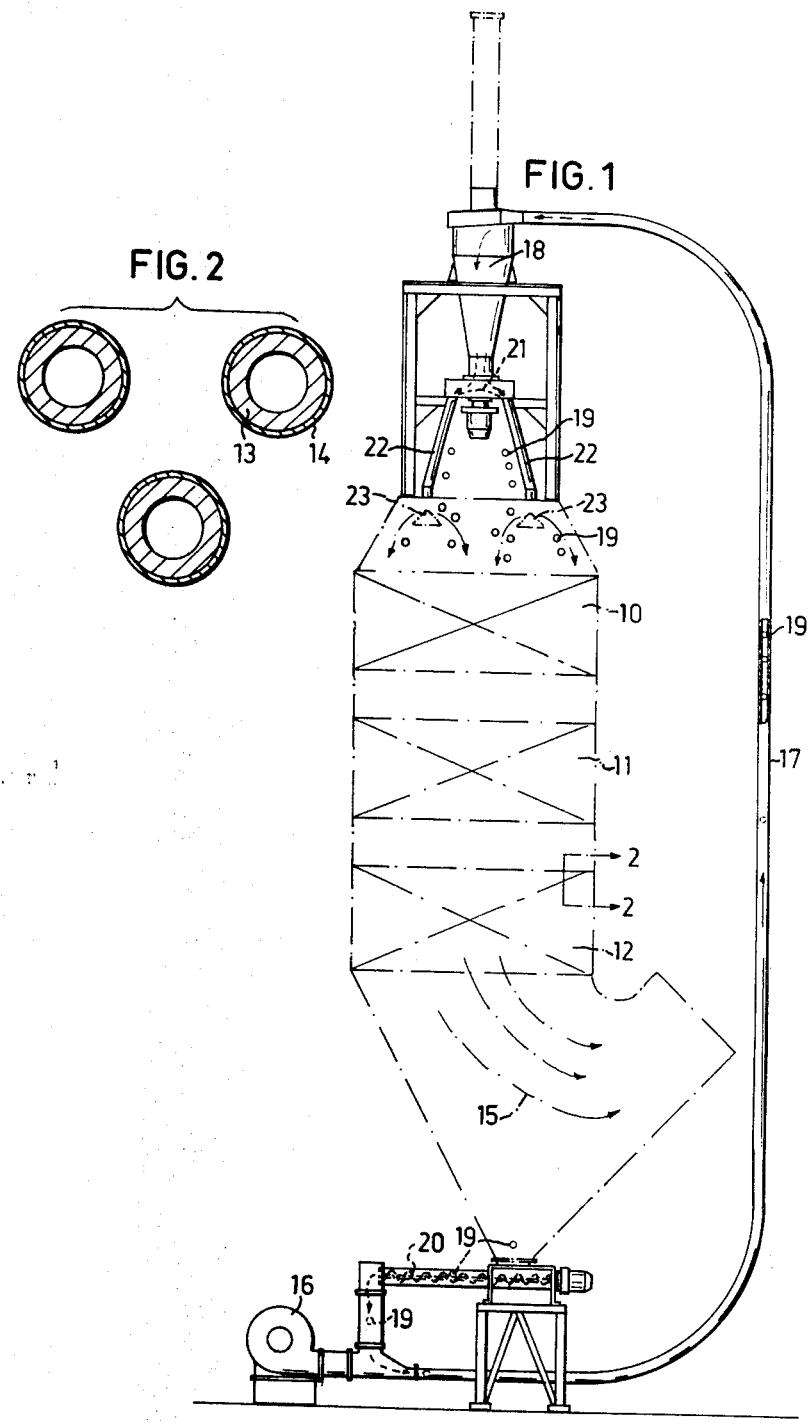
INVENTOR.
Krister Allan Ackerfeldt
BY
Pierce, Scheffler & Parker
Attorneys

METHOD OF CLEANING THE GAS-SWEPT HEATING SURFACES IN HEAT EXCHANGERS

The present invention relates to the cleaning of the gas-swept heating surfaces in heat exchangers. More particularly the invention relates to the cleaning of the outside of the heating tubes of different kinds of boilers.

It is well known in the art to use steel pellets as cleaning impact bodies which are dropped onto the heating surfaces to keep them clean and free of deposits, soot, rust and the like.

However, the steel pellets result in a heavy wear of the heating surfaces and of the conveying means employed for conveying the pellets from the bottom to the top of the gas-swept heat exchanging section of the boiler. In order to reduce the wear and deformation the heating surfaces such as heating tubes are partly shielded off by guard irons located spaced above the tubes to prevent the pellets from striking the tubes with full force. Nevertheless, these guard irons are also subjected to heavy wear caused by the pellets and must be replaced from time to time.

Another disadvantage is that the steel pellets and the steel tubes are subjected to rust and this rust will be freed from the pellets and the heating surfaces to follow with the flue gases out into the ambient atmosphere. When the gases are led out through a chimney large quantities of rust (ferrioxides) entrained in the flue gases will create a health hazard and may further damage, for instance, the paint work of motor cars.

It is therefore the object of the present invention to improve the cleaning methods hitherto known for cleaning heat exchanging apparatus of the kind under consideration. In accordance with the invention the cleaning impact bodies or pellets are of aluminum or alloys thereof. The aluminum pellets have preferably a size corresponding to balls having a diameter in a range between 5 and 10 mm, although the pellets may have a shape departing more or less from the spherical shape.

Thus, the impact bodies or pellets according to the invention will be considerably lighter than the steel pellets hitherto used and further, they will be of a softer material. As a result of this, the wear and deformation of the heating surfaces will be considerably reduced, although the stream of aluminum pellets is increased as compared with steel pellets in order to obtain the desired cleaning capacity.

The use of aluminum pellets according to the invention will further result in a considerably reduced content of rust particles in the flue gases leaving the chimney because the aluminum pellets are not subjected to rust. The rust removed from the heating steel tubes of certain boilers when changing from cleaning with steel pellets to cleaning with aluminum pellets according to the invention, is after some time of operation replaced by a coating of aluminum given off from the soft aluminum pellets when striking against the heating surfaces. This aluminum coating will than be maintained and renewed upon the continued use of aluminum pellets. The aluminum coating will thus form a smooth surface which is kept substantially free from soot and other deposits and therefore forms an effective heat exchanging surface. The aluminum coating will also protect the heating steel tubes from corrosion.

In heat exchanging apparatus of the kind under consideration the use of cleaning aluminum pellets will permit to dispense with the guard irons hitherto necessary. This will reduce the manufacturing cost of the heat exchanger, and further, a greater area of the heat exchanging surfaces will be exposed to the action of the pellets, thus resulting in a more efficient cleaning.

Within the scope of the invention it is preferred to employ the method according to the invention in heat exchanging apparatus which according to the invention have been provided with an aluminum coating on the heating surfaces already when manufacturing the heating surfaces. This means, that there is an aluminum coating on the heating surfaces from the very first use of the heat exchanging apparatus under consideration and that this aluminum coating will be maintained by the use of aluminum pellets.

Although the invention may be applied to any kind of heat exchanging apparatus hitherto cleaned by means of steel pellets, the invention is illustrated by way of example of a heating apparatus shown diagrammatically in the accompanying drawing.

FIG. 1 is a diagrammatic section through the heating tube section of a boiler, and FIG. 2 is an enlarged cross section according to line 2–2 in FIG. 1 of some of the steel tubes.

The flue gases are led downwardly through three sections 10, 11, 12 of steel tubes which are shown in detail in FIG. 2. Each steel tube 13 has a coating or layer 14 of aluminum or an alloy thereof, which preferably has been applied in connection with the manufacture of the tubes before mounting them into the boiler.

The direction of flow of the flue gases is indicated by the arrows 15.

In a manner known per se there is a pellet conveying and distributing arrangement operating with air pressure. A fan 16 produces the air pressure and blows air through a conduit 17 to the top of a hopper 18. Pellets 19 are fed by a screw conveyor 20 to its end where the pellets are dropped to the inlet of the conduit 17. The pellets are moved through the conduit by the air pressure and are dropped into the hopper 18 down onto a rotating table 21 to be spread to the inlets of a number of pipes 22 which direct the pellets to fall onto deflecting members 23. Thereafter, the pellets will strike against the tubes 13, 14 in the three sections 10, 11, 12 and return to the inlet end of the conveyor 20.

In accordance with the invention the pellets used are of aluminum or an alloy thereof and have a maximum diameter preferably in the range 5 to 10 mm.

When using the aluminum pellets 19 for cleaning of conventional steel tubes which are normally coated with rust, this rust will after some time of operation become removed and will in certain applications be replaced by a coating of aluminum 14 given off from the aluminum pellets. However, as explained above, the steel tubes 13 are preferably precoated with aluminum when manufacturing the tubes and this coating is maintained by using aluminum pellets according to the invention.

The heating surfaces may also be formed with heat exchanging flanges or other projections increasing the surfaces and the invention is also applicable to such kinds of heat exchanging surfaces.

I claim:

1. A method of cleaning gas swept heating surfaces in a heat exchanger which comprises dropping onto such heating surfaces a shower of impact bodies consisting of pellets having sizes corresponding to spheres having diameters within the range 5 to 10 mm. and formed of a soft metal selected from the group consisting of aluminum and aluminum alloys thereby removing unwanted deposits from such surfaces, separating the impact bodies from such removed deposits and reusing the separated impact bodies in a repetition of the cleaning procedure.

2. The method defined in claim 1, in which said impact bodies are dropped from such a height, above said heating surfaces, that soft metal is given off from said pellets and as a coating over said surfaces.